United States Patent
Mathur

(10) Patent No.: US 10,820,067 B2
(45) Date of Patent: Oct. 27, 2020

(54) AUTOMATED MEDIA PUBLISHING

(71) Applicant: Avid Technology, Inc., Burlington, MA (US)

(72) Inventor: Shailendra Mathur, Quebec (CA)

(73) Assignee: Avid Technology, Inc., Burlington, MA (US)

( * ) Notice: Subject to any disclaimer, the term of this patent is extended or adjusted under 35 U.S.C. 154(b) by 242 days.

(21) Appl. No.: 16/025,043

(22) Filed: Jul. 2, 2018

(65) Prior Publication Data
US 2020/0007955 A1 Jan. 2, 2020

(51) Int. Cl.
| | |
|---|---|
| *H04N 21/854* | (2011.01) |
| *H04N 5/262* | (2006.01) |
| *G06Q 10/10* | (2012.01) |
| *H04N 1/60* | (2006.01) |
| *H04N 5/341* | (2011.01) |
| *H04N 5/235* | (2006.01) |
| *H04N 5/232* | (2006.01) |

(52) U.S. Cl.
CPC ......... *H04N 21/854* (2013.01); *G06Q 10/103* (2013.01); *H04N 1/6002* (2013.01); *H04N 1/6058* (2013.01); *H04N 5/2355* (2013.01); *H04N 5/232935* (2018.08); *H04N 5/262* (2013.01); *H04N 5/341* (2013.01)

(58) Field of Classification Search
CPC ............................ G06Q 10/103; H04N 21/854
See application file for complete search history.

(56) References Cited

U.S. PATENT DOCUMENTS

| | | | |
|---|---|---|---|
| 2007/0239787 A1* | 10/2007 | Cunningham et al. ...................... | G06F 17/00 |
| 2009/0313546 A1* | 12/2009 | Katpelly et al. | ........ G06F 3/048 |
| 2010/0165112 A1* | 7/2010 | Scanlon et al. | .......... H04N 7/10 |
| 2013/0155264 A1* | 6/2013 | Zhou | ...................... H04N 5/228 |
| 2013/0216206 A1* | 8/2013 | Dublin et al. | ........... H04N 9/87 |
| 2013/0275312 A1* | 10/2013 | Claman et al. | ...... G06Q 10/103 |

(Continued)

OTHER PUBLICATIONS

Telestream Post Producer Product Sheet, Telestream, http://www.telestream.net/pdfs/datasheets/dat-Post-Producer.pdf, 4 pages, Feb. 2017.

(Continued)

*Primary Examiner* — James J Debrow
(74) *Attorney, Agent, or Firm* — Oliver Strimpel

(57) ABSTRACT

The described methods, systems, and computer program products enable media composition editors to tag compositional objects with editorial rendition rules that specify how rendering decisions are to be made and how source media assets are to be selected and processed to generate an output rendering of a media composition that adheres to the editor's rendition-related choices. The editorially-specified rendition rules include spatial-type rules, temporal-type rules, and color-type rules, and generally pertain to the spatial, temporal, and color ranges and resolutions to be included within a rendition. When a rendition of a media composition is to be generated, a rendition engine interprets and applies the editorial rendition rules to generate and output the rendition in accordance with rendition parameters supplied to the rendition engine by a rendition profile, and, in some cases, by the media composition and the source media assets.

20 Claims, 13 Drawing Sheets

(56) References Cited

U.S. PATENT DOCUMENTS

2014/0115056 A1     4/2014    Makower et al.
2015/0229679 A1     8/2015    Skillings

OTHER PUBLICATIONS

Media Central | Transcode, Avid Technology, Inc., https://www.avid.com/products/modiacentral/modiacentral-transcode, 4 pgs., printed Oct. 15, 2018.

SMPTE Standard, Interoperable Master Format—Core Constraints, ST 2067-2:2016, Copyright SMPTE 2016, 41 pgs. (Copyright protection non-public).

Hershleder, Benjamin, Avid Media Composer 6.x Cookbook, ProQuest Ebook Central, Jan. 1, 2012, 16 pgs.

Hershleder, Benjamin, Avid Media Composer 6.x Cookbook, Chapter 1, Getting Assets Into Your Media Composer Project, ProQuest Ebook Central, Jan. 1, 2012, 65 pgs.

Hershleder, Benjamin, Avid Media Composer 6.x Cookbook, Chapter 9, Output Tips and Tricks, ProQuest Ebook Central, Jan. 1, 2012, 31 pgs.

\* cited by examiner

| Parameter Type | Parameter Value | | |
|---|---|---|---|
| Composition | World News Roundup July 1, 2018 | | |
| Rendition Name | Network TV | In-flight | Smartphone |
| Type | Video HD | Video SD | Video SD Low Quality |
| Version | General | Airline | General |
| Aspect Ratio | 16:9 | 4:3 | 18:9 |
| Layout | Landscape | Landscape | Portrait |
| Resolution | 1920x1080 | 768x576 | 400x200 |
| Frames per Second | 29.97p | 29.97i | 15p |
| Duration | 28 minutes | 25 minutes | 30 minutes |
| Legal Color Range | HDR Dolby PQ 800 Nits | REC. 601 Color Safe | SRGB Color Safe |
| Gamut | Rec. 2020 | Rec. 601 | SRGB |
| Color Bit Depth | 10-Bit | 8-Bit | 8-Bit |

FIG. 3

AUTOMATED MEDIA PUBLISHING

BACKGROUND

Media is consumed around the world in theaters, in the office, at home, and in a host of other venues. It is viewed on large fixed screens, on hand-held mobile devices, and on a broad range of intermediate platforms. As the number of media consumption settings and platforms increases, there is a growing demand for a given item of media content to be delivered in versions and formats appropriate to each of the intended venues and platforms where it is delivered to the consumer. Furthermore, the means of publishing and distribution have also proliferated. As a result, a given media project may demand dozens, or even over a hundred different deliverables.

Present-day media publishing workflows are time-consuming, complex, error-prone, and ad-hoc. While those involved in creating media can cope with such inefficiencies when only a small handful of versions, renditions, and consumption vehicles were required, such methods become unwieldy and too costly as deliverables for a given media project proliferate. In addition, a creative editor involved in the story-telling stage of media creation does not have the ability to express their creative choices in the downstream rendering process. The media creation and publishing pipeline is therefore in need of new approaches to enhance the content and technical quality of media deliverables, as well as to boost productivity and control costs.

SUMMARY

In general, the methods, systems, and computer program products described herein enable rationalization and automation of parts of the media creation and publishing workflow. At any stage of the editorial process, editors are provided with the means to tag compositional objects with rules that specify how rendering decisions are to be made and how input sources are to be treated so as to generate an output rendering as specified by a rendition profile at the best possible quality, while adhering to the editor's rendition-related choices. These tags provide rules that are interpreted downstream by a rendition engine when rendering the composition. The rules specify how renditions are to be generated in response to a set of profiles specifying rendition requirements.

In general, in one aspect, a method of editing a media composition comprises enabling an editor using a media composition application running on a media composition host system to: edit the media composition, wherein the media composition includes a compositional object, and the compositional object references a source media asset; specify an editorial rendition rule for the compositional object; and associate the editorial rendition rule with the compositional object of the media composition; and when a rendition of a given media composition is to be generated, a rendition engine: receives the given media composition and an editorial rendition rule that the editor has specified and associated with a compositional object of the given media composition; receives a rendition profile that specifies media essence encoding parameters for the rendition of the given media composition; inputs a source media asset of the given composition; and generates from the source media asset of the given media composition the rendition of the given media composition in accordance with the editorial rendition rule of the given composition and the media essence encoding parameters for the rendition of the given composition.

Various embodiments include one of more of the following features. The media composition application includes the rendition engine. The rendition engine is hosted on a platform external to the media composition host. The rendition profile specifies a version of the given media composition that is to be used to generate the rendition of the given composition. The editorial rendition rule that the editor has specified and associated with a compositional object of the given media composition is a spatial editorial rendition rule and at least one of the media essence encoding parameters specified by the rendition profile is a spatial rendition parameter. The spatial rendition parameter is a framing box that defines a portion of a video frame of the compositional object of the given media composition, and the rendition engine prioritizes for inclusion within the rendition a first portion of the source media asset of the given composition that lies within the framing box. An aspect ratio of a target display for the rendition is larger than an aspect ratio of the framing box, and the rendition engine further prioritizes for inclusion within the rendition a second portion of the source media asset of the given composition outside the framing box, wherein the second portion of the source media asset of the given media composition includes media essence data. The editorial rendition rule that the editor has specified and associated with a compositional object of the given media composition is a temporal editorial rendition rule and at least one of the media essence encoding parameters specified by the rendition profile is a temporal rendition parameter. The temporal rendition parameter includes a temporal framing range that defines a temporal range within the source media asset of the given composition, and the logic of the rendition engine prioritizes for inclusion within the rendition a temporal portion of the source media asset of the given media composition that lies within the temporal framing range. The editorial rendition rule that the editor has specified and associated with the compositional object of the given media composition is a dynamic range editorial rendition rule and at least one of the media essence encoding parameters specified by the rendition profile is a dynamic range rendition parameter. The source media asset of the given composition is a video asset, and the dynamic range rendition parameter is a legal dynamic range that defines a range of pixel brightness values within the source media asset of the given composition, and the rendition engine prioritizes for inclusion within the rendition pixels of the source media asset of the given composition having brightness values that lie within the legal range. The source media asset of the given composition is an audio asset, and the dynamic range rendition parameter is a legal dynamic range that defines a range of audio sample intensity values within the source media asset of the given composition, and the rendition engine prioritizes for inclusion within the rendition audio samples of the source media asset of the given composition having intensity values that lie within the legal range. The editorial rendition rule that the editor has specified and associated with a compositional object of the given media composition is a color editorial rendition rule and at least one of the media essence encoding parameters specified by the rendition profile is a color gamut rendition parameter. The source media asset of the given composition is one of a graphics asset and a video asset, the color gamut rendition parameter includes a legal color range that defines a multi-dimensional region within a multi-dimensional color space, and the rendition engine prioritizes for inclusion within the rendition pixels of the source media asset of the given composition having color values that lie within the legal color range. The editorial rendition rule that the editor has specified and associated with a compositional object of the given media composition is a spatial editorial rendition rule for layout of title text on a frame of the rendition, at least one media essence encoding parameter is a spatial framing box, the source media asset of the given composition is a text titling effect, and the rendition engine renders text of the text titling effect within the framing box on the frame of the rendition. The editorial rendition rule that the editor has specified and associated with a compositional object of the given media composition is a compositing editorial rendition rule, at least one media essence encoding parameter is a spatial framing box, the source media asset of the given composition is a compositing effect, and the rendition engine renders a frame of the rendition with a composited image within the framing box. The rendition profile and the editorial rendition rule that the editor has specified and associated with a compositional object of the given media composition are received by the rendition engine in a standardized form, and the rendition engine comprises generic logic for executing rules. The rendition engine includes logic that is learned using deep learning methods from captured editorial rendition decisions of a cohort of editors working with a range of media content, source media types, and rendition requirements.

In general, in another aspect, a computer program product comprises non-transitory computer-readable storage with computer program instructions stored thereon, wherein the computer program instructions, when processed by a computer, instruct the computer to perform a method of editing a media composition, the method comprising: enabling an editor to edit the media composition, wherein the media composition includes a compositional object, and the compositional object references a source media asset, specify an editorial rendition rule for the compositional object, and associate the editorial rendition rule with the compositional object of the media composition; and when a rendition of a given media composition is to be generated, a rendition engine receives the given media composition and an editorial rendition rule that the editor has specified and associated with a compositional object of the given media composition, receives a rendition profile that specifies media essence encoding parameters for the rendition of the given media composition, inputs a source media asset of the given composition, and generates from the source media asset of the given media composition the rendition of the given media composition in accordance with the editorial rendition rule of the given composition and the media essence encoding parameters for the rendition of the given composition.

In general, in another aspect, a media composition editing system comprises a memory for storing computer-readable instructions and a processor connected to the memory, wherein the processor, when executing the computer-readable instructions, causes the system to enable an editor using a media composition application running on a system to: edit the media composition, wherein the media composition includes a compositional object, and the compositional object references a source media asset; specify an editorial rendition rule for the compositional object; and associate the editorial rendition rule with the compositional object of the media composition; and when a rendition of a given media composition is to be generated, a rendition engine: receives the given media composition and an editorial rendition rule that the editor has specified and associated with a compositional object of the given media composition; receives a rendition profile that specifies media essence encoding parameters for the rendition of the given media composition; inputs a source media asset of the given composition; and generates from the source media asset of the given media composition the rendition of the given media composition in accordance with the editorial rendition rule of the given composition and the media essence encoding parameters for the rendition of the given composition.

In general, in another aspect, a method of generating a rendition of a media composition comprises: receiving the media composition, wherein the media composition includes a compositional object that references a source media asset and the compositional object is associated with an editorial rendition rule specified by an editor of the media composition using a media composition application; receiving a rendition profile that specifies media essence encoding parameters for the rendition of the media composition; and generating from the source media asset the rendition of the media composition in accordance with the editorial rendition rule and the media essence encoding parameters for the rendition of the media composition.

Various embodiments include one or more of the following features. The media composition has a plurality of versions, and the rendition profile further specifies a version of the plurality of versions of the media composition that is to be used to generate the rendition of the composition. The editorial rendition rule is a spatial editorial rendition rule and at least one of the media essence encoding parameters specified by the rendition profile is a spatial rendition parameter. The spatial rendition parameter is a framing box that defines a portion of a video frame of the compositional object of the media composition, and a first portion of the source media asset of the composition that lies within the framing box is prioritized for inclusion within the rendition. An aspect ratio of a target display for the rendition is larger than an aspect ratio of the framing box, and a second portion of the source media asset of the composition outside the framing box is also prioritized for inclusion within the rendition, wherein the second portion of the source media asset of the media composition includes media essence data. The editorial rendition rule is a temporal editorial rendition rule and at least one of the media essence encoding parameters specified by the rendition profile is a temporal rendition parameter. The temporal rendition parameter includes a temporal framing range that defines a temporal range within the source media asset of the composition, and a temporal portion of the source media asset of the media composition that lies within the temporal framing range is prioritized for inclusion within the rendition. The editorial rendition rule is a dynamic range editorial rendition rule and at least one of the media essence encoding parameters specified by the rendition profile is a dynamic range rendition parameter. The source media asset of the composition is a video asset, and the dynamic range rendition parameter is a legal dynamic range that defines a range of pixel brightness values within the source media asset of the composition, and pixels of the source media asset of the composition having brightness values that lie within the legal range are prioritized for inclusion within the rendition. The source media asset of the composition is an audio asset, and the dynamic range rendition parameter is a legal dynamic range that defines a range of audio sample intensity values within the source media asset of the composition, and audio samples of the source media asset of the composition having intensity values that lie within the legal range are prioritized for inclusion within the rendition. The editorial rendition rule is a color editorial rendition rule and at least one of the media essence encoding parameters specified by the rendition profile is a color gamut rendition parameter. The composition is one of a graphics asset and a video asset, the color gamut rendition parameter includes a legal color range that defines a multi-dimensional region within a multi-dimensional color space, and pixels of the source media asset of the composition having color values that lie within the legal color range are prioritized for inclusion within the rendition. The editorial rendition rule is a spatial editorial rendition rule for layout of title text on a frame of the rendition, at least one media essence encoding parameter is a spatial framing box, the source media asset of the composition is a text titling effect, and text of the text titling effect is rendered within the framing box on the frame of the rendition. The editorial rendition rule is a compositing editorial rendition rule, at least one media essence encoding parameter is a spatial framing box, the source media asset of the composition is a compositing effect, and a frame of the rendition with a composited image within the framing box is rendered. The generating step includes interpreting the editorial rendition rule using generic logic for executing rules. The generating step includes executing logic that is learned using deep learning methods from captured editorial rendition decisions of a cohort of editors working with a range of media content, source media types, and rendition requirements.

In general, in another aspect, a computer program product comprises non-transitory computer-readable storage with computer program instructions stored thereon, wherein the computer program instructions, when processed by a computing system, instruct the computing system to perform a method of generating a rendition of a media composition, the method comprising: receiving the media composition, wherein the media composition includes a compositional object that references a source media asset and wherein the compositional object is associated with an editorial rendition rule specified by an editor of the media composition using a media composition application; receiving a rendition profile that specifies media essence encoding parameters for the rendition of the media composition; and generating from the source media asset the rendition of the media composition in accordance with the editorial rendition rule and the media essence encoding parameters for the rendition of the media composition.

Various embodiments include one or more of the following features. The computing system is remote from a location from which the media composition is received. The computing system is implemented in the cloud.

In general, in another aspect, a media composition rendition engine comprises: a memory for storing computer-readable instructions and a processor connected to the memory, wherein the processor, when executing the computer-readable instructions, causes the media composition rendition engine to: receive a media composition, wherein the media composition includes a compositional object that references a source media asset and the compositional object is associated with an editorial rendition rule specified by an editor of the media composition using a media composition application; receive a rendition profile that specifies media essence encoding parameters for the rendition of the media composition; and generate from the source media asset the rendition of the media composition in accordance with the editorial rendition rule and the media essence encoding parameters for the rendition of the media composition.

Various embodiments include one or more of the following features. The media composition rendition engine is located remotely from a location from which the media composition is received. The media composition rendition engine is implemented in the cloud.

BRIEF DESCRIPTION OF THE DRAWINGS

FIG. 3 shows a set of rendition profiles for a given composition.

DETAILED DESCRIPTION

Figure 1:
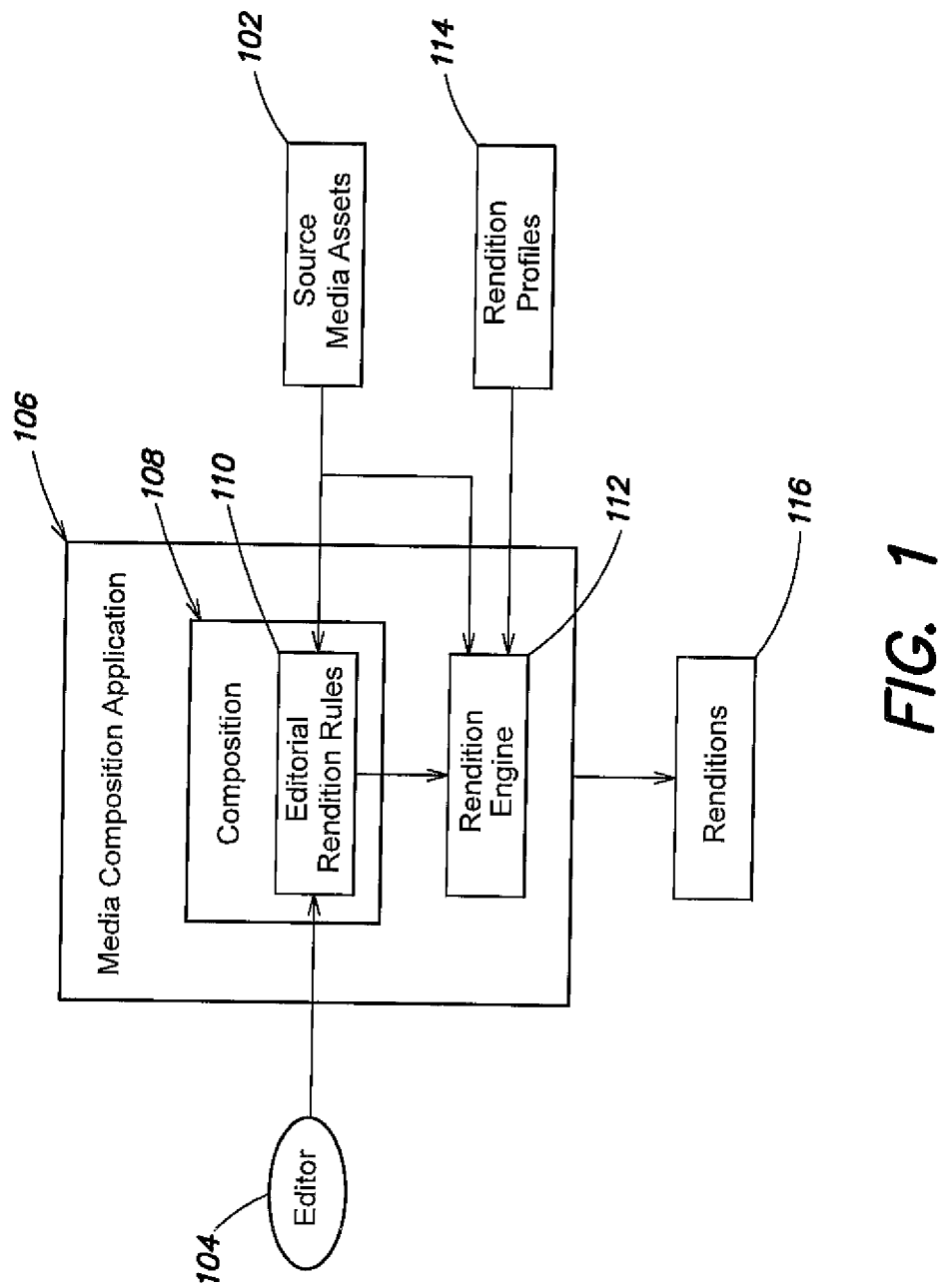
FIG. 1 is a high-level block diagram illustrating the described media publishing workflow.

The systems and methods described herein provide a new paradigm for generating a set of media deliverables that stem from a given composition or a set of related compositions. We describe a workflow in which compositions are tagged with rendering rules that are inserted at the editorial stage. The rules are interpreted downstream in an automated or semi-automated fashion when deliverable media-based products are rendered. The typical end-to-end media workflow includes: (i) creating a composition; (ii) optionally creating a family of versions based on one or more compositions with variations in content catering for various target geographies, consumer demographics, and consumption venues; (iii) generating renditions from the family of versions or, if no versions are produced, directly from the composition; and (iv) generating and distributing deliverable media packages from the renditions. The focus here is on the optimization and automation of the rendering of the media products to be published, i.e., generating the renditions in stage (iii) in the workflow. As used herein, a rendition is a "flattened" rendering of a media composition in a form that can be consumed, i.e., played back, by a target platform. Common rendition formats include Audio Interchange File Format (.AIFF), WAVE Audio File (.WAV), MP3 Audio File (.MP3), MPEG Movie (.MPG), Apple QuickTime Movie (.MOV), Windows Media Video File (.WMV), Material Exchange Format (MXF), Interoperable Mastering Format (IMF), and Digital Cinema Package (DCP).

In general, there is a need to adapt and optimize a given media composition for the multiple contexts in which it is to be consumed. Traditionally, this has been accomplished by a transcoding process, which involves spatial, temporal, and color reformatting and compression of a high quality flattened file, typically referred to as a "master." The master represents a final mix in which multiple tracks and effects have been mixed down into a single media stream. When transcoding from a master, the quality of the resulting program is limited to that of the master, since, at best, transcoding operations preserve the quality of the master, and in most cases, degrade it.

The term "master" is also used when referring to a distribution master. Distribution masters are packages that are assembled for distribution to various media outlets and businesses. The packages include multiple alternative options for such aspects as language, program length, and target display parameters. The media (i.e., video and audio) options included within distribution masters are mixed-down files that were generated by transcoding an original master into the required formats. Thus, although such distribution masters may include multiple alternative tracks, each of these is included as a "flattened" alternative, not as a compositional element of the program defined in terms of the original source assets. Indeed, source assets are not even included within the distribution package. As an example, a distribution master created for Eastern Canada would include both English and French dialog tracks, and video files formatted for a smartphone and an HD television. Digital Cinema Package (DCP) and Interoperable Mastering Format (IMF) are two examples of distribution master types.

By contrast, the methods and systems described herein defer the irreversible application of editing decisions relating to publication of a media deliverable until the specific requirements of the deliverable are known and the deliverable is generated. The original edited composition and original source assets are made available, enabling the rendition choices, such as track mixing, compositing, and application of effects, to be performed on the original sources of media rather than on the mixed-down versions. For example, to generate a 4K resolution deliverable after editing 4K source media in an HD mezzanine format, traditional methods resample the edited HD master to generate the 4K deliverable, resulting in a quality lower than that of the original. By contrast, using the methods described herein, the deliverable is generated directly from the 4K source material after the editing is complete. The layout of text, such as titles or closed captions provides another example. With existing methods, if the text does not fit on a required destination screen size, the only option available is to scale or crop the entire image, which might cause the text to become illegible or be cropped out of the deliverable. In the approach described herein, the original media and the titling effect is still available when the destination screen size is specified, so if text would not fit, perhaps because of the destination screen aspect ratio, the titling effect is rerun and the text is laid out so that is fits the destination screen optimally. A further example involves color correction. If final output to a high dynamic range (HDR) capable monitor is specified, an 8- or 10-bit master would not supply the whole brightness range available to be displayed. But with the original media composition and source media assets still available, the full dynamic range of the original can be included in the distributed rendition.

To implement such a workflow, added functionality is added to the editing environment to enable an editor to specify rules and corresponding parameters that define how renditions are to be generated, and to associate these rules with the media composition, or more specifically, with a compositional object of the media composition. The rules are exposed to automatic rendering software when the renditions are generated from the composition. The methods described here provide mechanisms for editors to ensure that their ability to embody the story they wish to tell in the media, i.e., their full creative intent, is automatically made known downstream when renditions are generated, rather than recreated by laborious manual sub-editing. We refer to such rules as "editorial rendition rules," since they are essentially editorial in nature, and are to be distinguished from media format rendition rules. The latter serve to optimize the structure and format of the media files and technical media quality by specifying the conditions under which various codec parameters are applied when generating the renditions. In existing workflows, common format decisions are specified by personnel downstream of the creative editorial and assembly/finishing process. In some cases, the format decisions and encoding are performed manually. The methods described herein support the automation of this stage of the workflow as well. However, the media format rules and parameters are supplied as part of the rendition specifications, provided within a rendition profile (described below) rather than within the media composition.

The methods described herein serve to enhance the ability of media publishers and distributors to monetize their assets by providing the ability to repurpose archived assets. Since creative decisions are performed on the original source media assets and stored as metadata in association with those assets in the archive, the full range of media scope and quality remains available for generating renditions at any time. This applies to the spatial domain (original large raster), temporal domain (original frame rate), and color domain (original dynamic range).

FIG. 1 is a high-level diagram illustrating the described media publishing workflow and the data objects involved in the process. Source media assets 102, such as video clips, audio clips, computer-generated imagery, and special effects provide the source of material that is used by editor 104 using media editing application 106, which may be a non-linear video editor, a digital audio workstation (DAW), or a special effects application, to create composition 108. Examples of such applications include MEDIA COMPOSER®, a non-linear video editor, and PRO TOOLS®, a DAW, both from Avid® Technology, Inc., Burlington, Mass., and AFTER-EFFECTS® a visual effects, motion graphics, and compositing application from Adobe® Systems, Inc. Composition 108 is represented by multiple tracks that include clips of source media assets 102 arranged in a sequence, together with rich metadata that specify the editing decisions, parameters, and settings. The composition includes references to all the source media assets, effects, and metadata required to play back or render the composition. Such an "unflattened" composition is in a form that permits further editing, and is to be distinguished from the traditional flattened file "master" referred to above, and from distribution masters such as DCP and IMF. The structure of a composition varies from application to application. For example, MEDIA COMPOSER refers to a video composition as a "sequence" and it includes settings, bin files, and clips, with the sequence metadata including references to the sources. PRO TOOLS refers to an audio composition as a "session," which includes metadata specifying the audio editing and mixing decisions and settings, and references to source assets such as audio files and effects. Graphics and compositing compositions are represented as scene graphs that specify the editing decisions applied to the graphics source assets.

Figure 2:
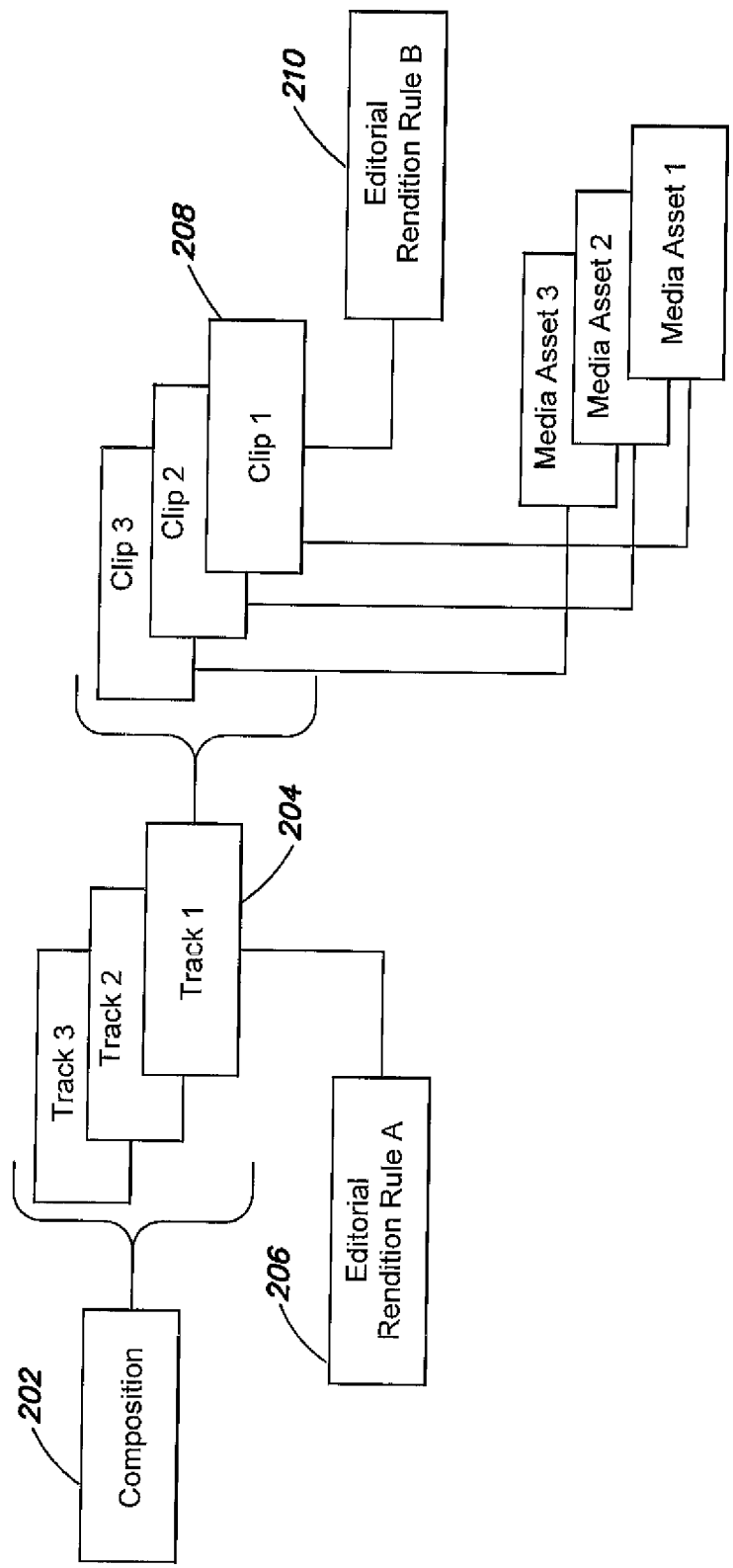
FIG. 2 illustrates a media composition tagged with editorial rendition rules.

As mentioned above, the editing phase is extended beyond its traditional scope by enabling editors to specify editorial rendition rules 110. When an editor specifies an editorial rendition rule, the media composition application attaches the rule together with the values of any parameters it might require to the appropriate compositional object in the composition. FIG. 2 illustrates a compositional data model for composition 202 that comprises three tracks, each track including one or more clips. Tracks and clips are examples of compositional objects. Track 1 204 is associated with editorial rendition rule A 206, and clip 1 208 is associated with editorial rendition rule 210. The step of associating an editorial rendition rule with a compositional object is also referred to herein as tagging the compositional object with the rule. The media composition application supplies a user interface that enables the editor to create and input the editorial rendition rules and parameters for a selected compositional object of a media composition. Once specified by an editor, the editor is able to tag the compositional object with the editorial rendition rule, and the rule becomes a part of the media composition, as illustrated in FIG. 2. Examples of editorial rendition rules are discussed below.

When one or more renditions of a composition are to be generated, editorial rendition rules 110 are interpreted by rendition engine 112 in accordance with the media deliverable requirements as specified by rendition profiles 114 to generate renditions 116. Rendition engine logic attempts to generate each rendition at the quality commensurate with its corresponding rendition profile. Since the rendition engine starts from the original source assets without relying on intermediate files, this quality may be equal to or less than that of these assets. Access to source effects as well as source media also provides a high degree of flexibility as to how the effects are applied in view of the specified parameters.

Rendition profiles 114 include one or more individual rendition profiles, one for each rendition that is to be generated. Each rendition profile specifies: (i) for workflows that include a version stage, the version that is to be used; (ii) a structural description of the media package that is to be generated from the version, e.g., Interoperable Master Format (IMF), Material Exchange Format (MXF) OP-Atom and OP1a; (iii) essence encoding parameters, including but not limited to: spatial parameters such as spatial framing boxes; temporal parameters such as temporal framing ranges; and color parameters such as dynamic range and color legal ranges; and (iv) the distribution method to be deployed. In addition, a rendition profile may include one or more editorial rendition rules, perhaps previously specified by an editor when the rendition requirements were initially defined. These may supplement the editorial rendition rules embedded within the composition. Furthermore, certain rendition parameters, such as a valid box or framing box (see below) may be present within source media assets 102, and, in accordance with editorial rendition rules 110, may be given priority over corresponding parameters present within a rendition profile. However, the logic used by the rendition engine to interpret the parameters and generate the renditions is the same no matter what the source of the rendition parameters. FIG. 3 is an exemplary illustration of a set of rendition profiles for a given composition.

In some workflows, renditions may be generated from media assets that include one or more partially mixed down media files. Such an intermediate file is then combined with other original media and/or effects during the rendition phase. In other examples, a background track is flattened, but the title track is left intact for the renditioning phase, or a mixed-down mono audio track is used in the renditioning phase to mix in dialog in a language specified just prior to rendition. Thus, some renditioning decisions remain deferred, retaining flexibility in the final renditioning, while other decisions are committed in an earlier phase of the workflow.

In the final phase of the workflow, one or more renditions are packaged up into distribution masters which are then distributed to the locations where they are to be consumed.

Figure 4A:
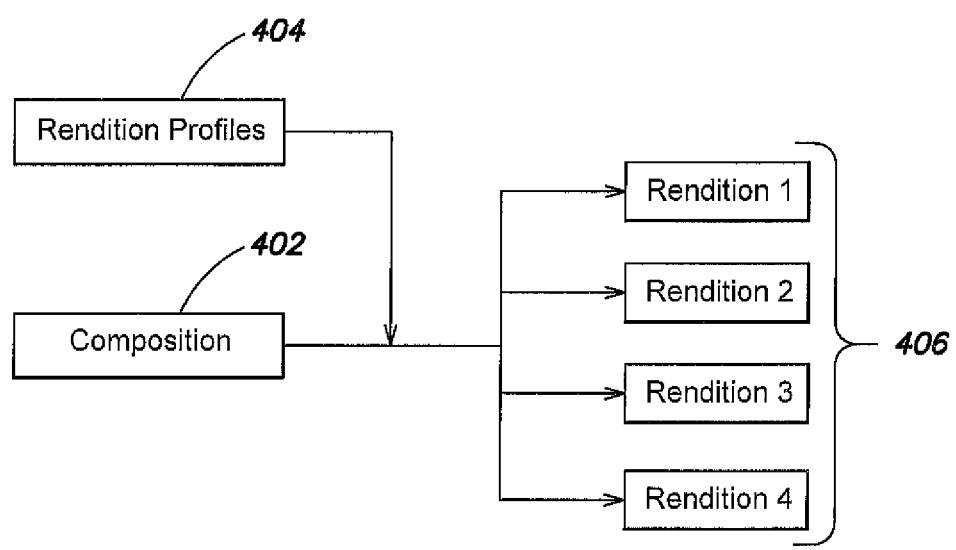
FIG. 4A illustrates the generation of multiple renditions from a single composition.
Figure 4B:
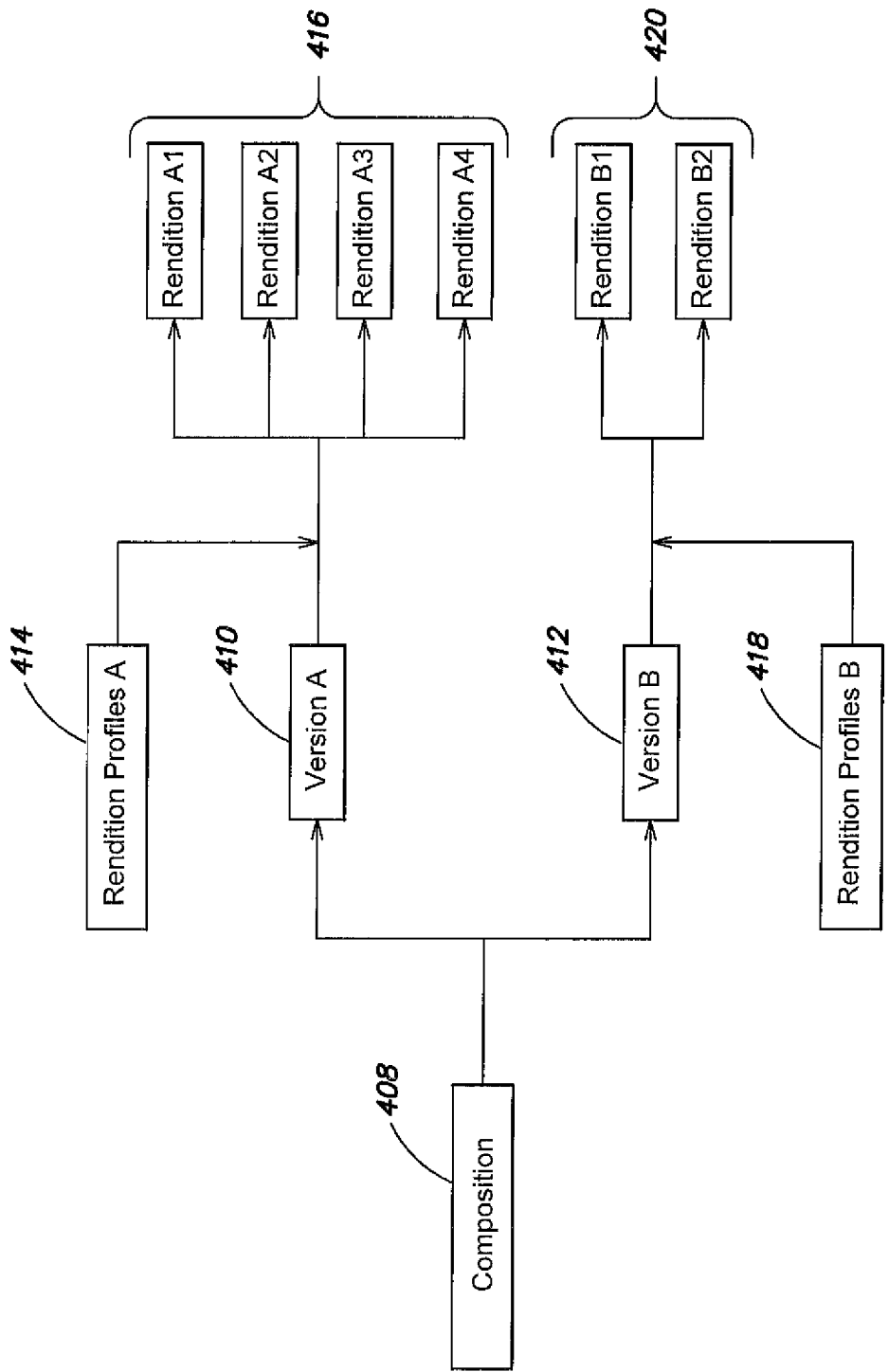
FIG. 4B illustrates the generation of renditions in workflows that include multiple versions of a composition.

FIG. 4A illustrates the generation of multiple renditions 406 from single composition 402. Each rendition is specified by a corresponding member of a set of rendition profiles 404. FIG. 4B illustrates the generation of renditions in workflows in which multiple versions of a composition are generated, each of which may then be used as the basis for a set of renditions. A version refers to a variation of a composition that includes a variation in content and/or timing of certain elements. Other sources or compositions in the form of a submaster or an encapsulated clip or partial mix-down may also provide content for various versions. For example, a set of versions representing episodes of a serial program may include content from a composition representing the individual content of the episode, as well as content from a second master containing an opening sequence that is reproduced in each episode. Multiple versions of a composition may each include a dialog track in a different language. In addition to the dialog track, the variations required to implement different language versions may also involve titling, subtitling, and scene selection. Another version type is one in which one or more scenes have been added or removed based on the intended consumption venue. For example, scenes involving airplane accidents are removed from an in-flight airline version. Versions to be shown to a general audience may contain different scenes from those intended for an adult audience. Another type of versioning involves the insertion of advertisements within a program, or a range of place-holder lengths for advertisements to be added at the time of distribution. The set of versions to be generated may be specified by a set of version profiles, which may be supplied after the editing of the composition is under way or completed. Referring to FIG. 4B, composition 408 is used as the basis of version A 410 and version B 412. In accordance with rendition profiles A 414, version A is used as the compositional basis from which renditions A1, A2, A3, and A4 416 are generated, and, in accordance with rendition profiles B 418, version B is used as the compositional basis from which renditions B1 and B2 420 are generated.

When generating a rendition in accordance with a given member of a set of supplied rendition profiles, the rendition engine executes the logic required to read the media composition and its compositional objects (or which version of the composition if versions exist), and use it to convert the source media assets, effects, into the specified rendition, invoking one or more of spatial, temporal, or color-related rendition logic in accordance with the editorial rendition rules as they apply to the essence encoding parameters supplied by the given rendition profile. In addition, the rendition rules may enable the editor to specify rules to optimize the choice of source media assets when multiple alternative assets are available. The alternative assets may differ from each other in one or more of their spatial, temporal, or color resolution or range. The rendition engine receives the editorial rendition rules from the tagged composition itself, and receives the rules' corresponding parameters from one or more of the composition rule itself, the rendition profiles, and the source media assets.

Figure 5:
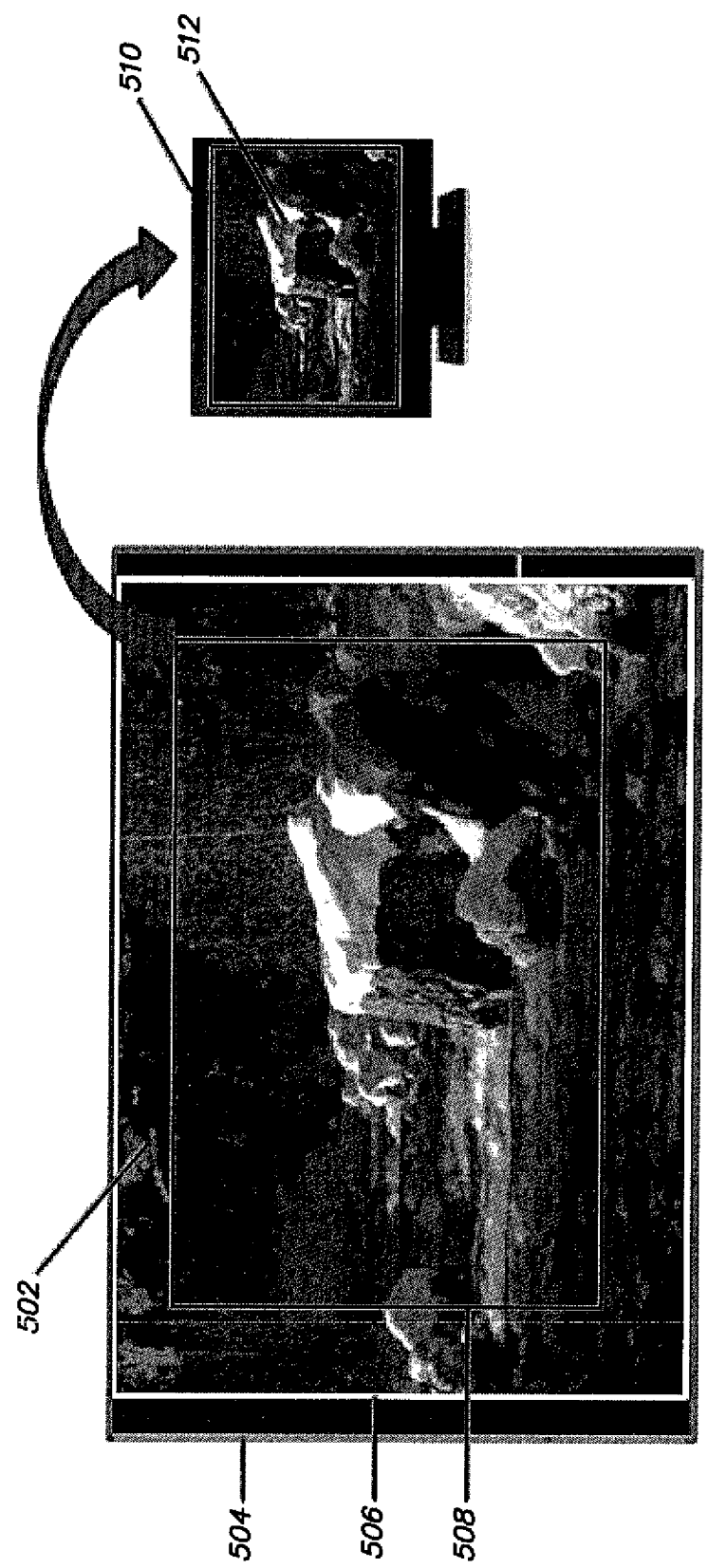
FIG. 5 illustrates three boxes that define spatial rendition parameters.

We now describe three categories of rendition rules and their parameters: spatial, color, and temporal. Spatial parameters relate to the x, y range within a video frame. Three boxes define the spatial parameters, as illustrated in FIG. 5. For video frame 502, essence box 504 defines the extent of the image for which samples exist. It may include black samples that have been previously introduced as padding. Valid box 506 defines the extent of the pixels that include image content as opposed to the pixels previously introduced for padding. One or more framing boxes defined by an editor constitute the editor's assessment as to where the most significant portion of the image lies. The editor may use a framing box to define a safe action region, a safe title region, or to tell the system where the actor is in the image. The framing boxes are invoked in accordance with a spatial type editorial rendition rule to determine which portion of a frame should be given priority for inclusion in a rendition. Other rules constrain the geometry of the framing box that is to be used, depending, for example, on the aspect ratio of the target playout display as specified by the rendition profile. FIG. 5 shows framing box 508, which illustrates an example in which the aspect ratio of framing box 508 and target screen 510 are the same, and the entire range defined by the framing box is included within rendition frame 512. Unlike the essence box and the valid box, which are defined within the source media asset, the framing box is editorial in nature. The media composition application being used by the editor supplies a user interface that enables the editor to specify the framing box for individual frames, clips, or other portions of the composition. In an exemplary user interface, the application enables the editor to draw a framing box on top of a display of a video frame displayed in a play-back window within the application's user interface.

Figure 6:
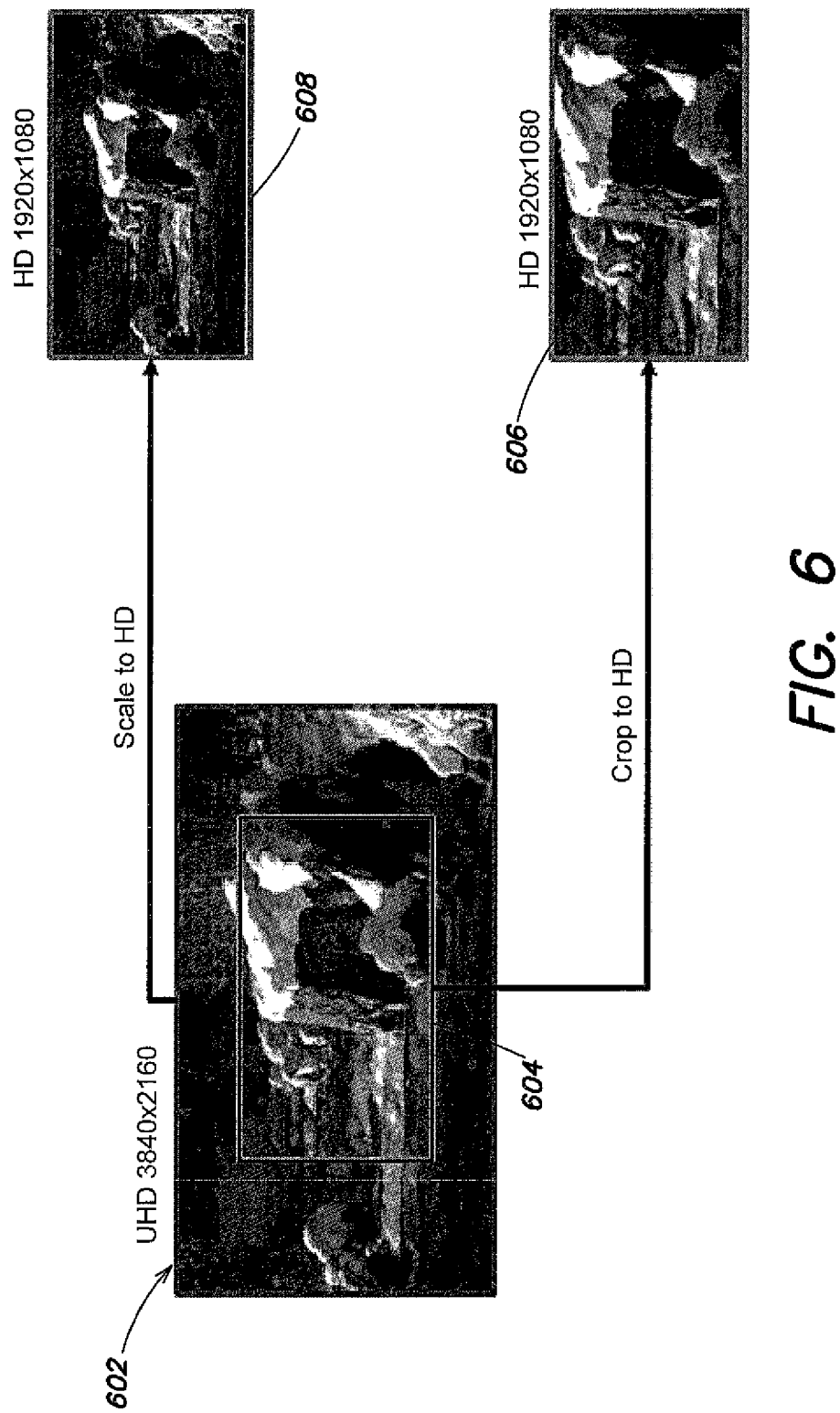
FIG. 6 illustrates how two different spatial rendition rules cause different renditions to be generated for two renditions having the same spatial parameter in their rendition profiles.

Spatial rendition parameters are resolution-independent. Thus, the framing box defines the portion of the image that the editor wishes to call out in terms of an x, y range of pixels. FIG. 6 illustrates how two different spatial rendition rules cause different renditions to be generated for two renditions having the same spatial parameter (in this case resolution parameter) in their rendition profiles. Source image 502 has a resolution of 3840×2160. Framing box 604 defines an x, y range of (1000-2920), (540-1620), which, without changing the resolution, results in image 606 with an HD resolution showing a cropped portion of source image 602 spanning the range defined by the framing box. By contrast, the full range of source image 602 may be scaled to HD resolution image 608 just by changing the resolution without changing the range. The decision as to whether to scale or crop (or, more generally, selecting a combination of cropping and scaling) to generate a 1920× 1080 HD image is essentially editorial in nature since it may depend on a qualitative assessment as to whether the overall quality of the rendered image is more important and the source image should be scaled, or whether the possible loss of quality is less important than cropping the image to focus the consumer's attention on the crucial content of the image. This example illustrates the ambiguity that can arise without the guidance of a spatial editorial rendition rule, when a sub-editor or an automated renderer might make a poor choice, such as inadvertently cropping out the most important part of the frame.

Hinging rules are another type of spatial rendition rule. A hinging rule specifies how an interactive element, typically a graphical object, is to be laid out on the rendered display. These rules involve a hinge location parameter. For example, a bar chart that may be adjusted by a television presenter may be hinged at the bottom, with its vertical extent changing with respect to the fixed hinge location. Other spatial rules and parameters define placement of displays within a set of displays, such a video wall, and compositing rules, e.g., for picture within picture compositing.

The following is an example of rendition engine logic for using the spatial framing box. If the rendition target display has the same aspect ratio as the framing box the following rules apply. If the target display resolution is the same as the resolution within the framing box, the rendition engine simply extracts the range of the framing box within the source media asset for the rendition. If the target display has a lower resolution than the framing box, the range of pixels within the framing box is down-sampled to the target resolution. If the target display has a higher resolution than the resolution within the framing box, the range of pixels to be included in the rendition is expanded symmetrically about the framing box in the source media asset. If such expansion results in the rendition box reaching the valid box, then either the additional resolution required beyond the point at which the valid box is reached is obtained by upsampling of the valid box-limited range, or the target display is allowed to include non-essence portions outside the valid box but within the essence box. In the latter case, if the limit of the essence box is also reached before the target resolution is attained, the remaining required resolution is obtained by up-sampling the essence box-limited range.

If the rendition target display has a higher aspect ratio (i.e., increased ratio of the x-resolution to the y-resolution) than the aspect ratio of the framing box, the following rules apply. The x-range of the rendition box is increased symmetrically on either side of the framing box without changing the y resolution until the target aspect ratio is reached. If the resulting resolution matches that of the target display, this becomes the rendition box. If the target display has a lower resolution, the box is down-sampled to match the target. If the valid box is reached before the target aspect ratio is obtained, then if the valid box is reached on only one end of the range, the range is increased within the valid box at the other end of the range. If both ends of x-range reach the valid box before the target x-resolution is obtained, then the additional increase in aspect ratio still required is obtained by including pixels outside the valid box but within the essence box. If there are insufficient media samples even in the essence box to accommodate the desired aspect ratio, then either additional padding is inserted at the bottom and top of the x-range, or the y-range is cropped. Once the desired aspect ratio is reached, the resulting box becomes the rendition box if the resolution matches the requirement, or is down-sampled if it exceeds the target resolution. Analogous logic is applied if the target aspect ratio is lower than that of the framing box.

Rendition engine logic may be used to lay out text to take account of the target aspect ratio. For laying out closed captions or subtitles, the length of a line of text may be specified as a percentage, e.g., 75%, of the horizontal range of the target display. Similarly, the font size may be scaled to a resolution commensurate with the resolution available on the target display. Since text can interfere with the image onto which they are superposed, rendition engine logic may seek to avoid or minimize placement of subtitles over the range defined by the framing box when ranges are available outside the framing box range on a target display. The renditioning engine then lays out the text afresh for each rendition without the need to introduce text scaling artifacts that may impair readability. Similar rules for aesthetic layout of text also apply to titles, such as those displayed at the beginning and end of a video composition, or in titles that demarcate individual scenes.

Figure 7:
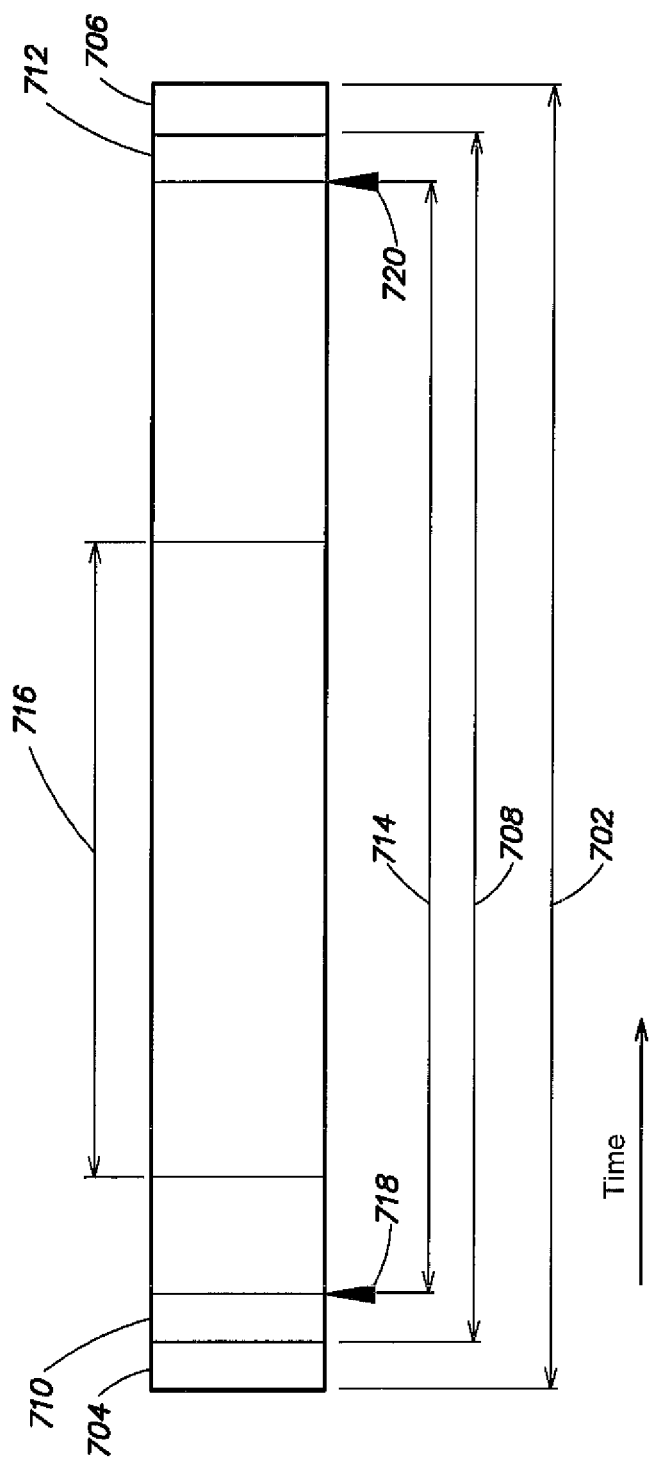
FIG. 7 illustrates an idealized timeline showing temporal rendition parameters.

Temporal rendition parameters are analogous to the spatial parameters discussed above. As illustrated in the idealized timeline of FIG. 7 with time along the horizontal axis, a full clip corresponding to temporal essence range 702 may include headers 704 and footers 706 such as a count-down clock and color bars that are not part of the original footage. The entire clip spanning the full essence range is equivalent to the essence box defined above. Valid range 708 excludes the non-original headers and footers, but includes head 710 and tail 712 of a clip, which are typically designed for use within a transition, e.g., a cross-fade to a preceding or succeeding clip. Typically, such heads and tails include 5-20 frames of video. Framing range 714 is the portion of a clip within the essence range that excludes both non-original header 704 and footer 706, as well as head 710 and tail 712. The framing range indicates the temporal range where the most important content lies. Additional temporal framing ranges may be inserted to provide a guide to a hierarchy of content within the clip. For example, second framing range 716 indicates an editor's specification of the temporal portion of the clip to be used for down-stream on-the-fly editing down to about 50% of the original clip length. This enables automated downstream editing of a composition to different lengths, without risking loss of the most important content. As with the spatial rendition parameters, the temporal essence range and valid ranges are a property of the source media asset, but the framing range may be specified by the editor. The user interface of the media composition application enables the editor to specify the framing range, for example by inserting markers 718 and 720 on a displayed timeline representation of the clip to denote the beginning and end of the framing range.

Rendition engine logic for temporal rendition parameters is similar to that of the spatial framing box. If the target duration of a clip specified in a rendition profile is identical to that specified by the framing range, that portion of the clip is included within the rendition. If a duration longer than that of the framing box is required in a rendition, additional content beyond the framing range but within the valid range is added. In a specific use case, the duration of a broadcast rendition may depend on the number of inserts, such as advertisements to be aired, since the combined duration of the rendition and the inserts must fit into a predetermined overall allotted time. This may be determined shortly before air time, which makes automated rendering according to previously created editorial rendition rules especially valuable. Supplemental framing ranges (e.g., FIG. 7, 716) enable the rendition engine to cut content in accordance with various anticipated insert durations represented by editorially specified reduced length framing ranges, such as reductions of 30 seconds, 1 minute, or two minutes. In another use case, as part of a final edit, a new effect is applied that requires a longer duration, such as in a fade transition. In this situation, additional content will then extend beyond the framing box into the valid range. If the longer duration cannot be fully supplied by the valid range, and no additional material is present in the source media, then other techniques to extend the duration may be used, such as frame replication, or padding the tail of the clip with graphics or black frames.

Figure 8:
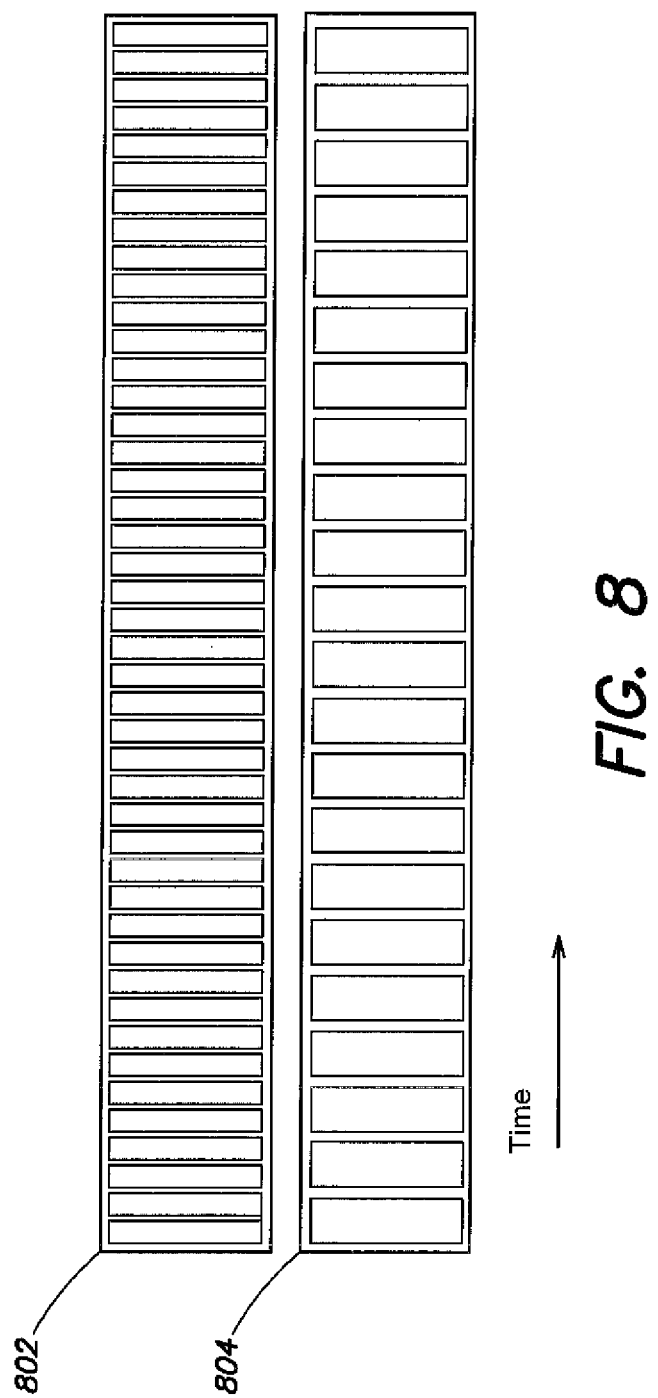
FIG. 8 illustrates the distinction between temporal range and temporal resolution.

The distinction between temporal range and temporal resolution, i.e., video frames per second (FPS) or audio samples per second, is illustrated in FIG. 8, which shows two video clips 802 and 804 that have the same temporal range, but different temporal resolution. Clip 802 has twice the temporal resolution of clip 804, e.g., 50 FPS versus 25 FPS.

In some renditions, the required frame rate may depart from that of the source media assets. For example, a film frame rate of 24 frames per second (FPS) may need to be rendered at a video frame rate of 25 FPS (for PAL encoding) or 29.97 frames per second (for NTSC encoding). When such conversions are performed, editorial rendition rules determine whether to preserve the duration of the clip or whether to allow the clip duration to change. If the duration of the clip is to be preserved when converting to higher frame rates, additional frames are obtained, either by interpolation methods, e.g., by 3:2 pull-down, or by adding extra content to the clip. If the duration of the clip is to be preserved when converting to lower frame rates, the clip is scaled to fewer frames by removing frames from the clip, optionally using the frames being removed to adjust/blend the frames retained. If the duration of the clip is allowed to vary, the speed of the video may be changed, i.e., slightly slowed down or speeded up while keeping the number of frames in the clip constant. When rendering a 24 FPS source to a 25 FPS rendition, straightforward tempo scaling is normally considered acceptable with a corresponding slight reduction in clip duration, but when rendering a 24 FPS source to a 29.97 FPS rendition, straightforward scaling would result in an excessive speed-up. Therefore, in this situation, new interpolated frames are inserted to preserve the tempo and duration.

Color rendition rules and their associated parameters direct the rendition engine to select the portion of the black-and-white dynamic range, or the portion of the multi-dimensional color range within a video encoding which is to be mapped to a target display. For example, an editorially specified legal range may correspond to the color range capable of being displayed on an SD or on an HD television set. Another editorially specified legal range may correspond to the wider color range capable of being displayed on an HDR display.

A first set of color parameters defines dynamic ranges. The essence range corresponds to the range of values that an encoding of the pixel values of an image may take. This is a function of the bit depth, i.e., the number of bits assigned to represent each pixel. The valid range corresponds to the range of values over which media samples exist. The range of actual encoded values in an image span the legal range, which is typically a subset of the essence range. The legal range, which corresponds to the framing ranges defined above, is the range of encoded values to which the editor maps the range between the reference black and white points, often referred to as 0 to 100% IRE.

Figure 9:
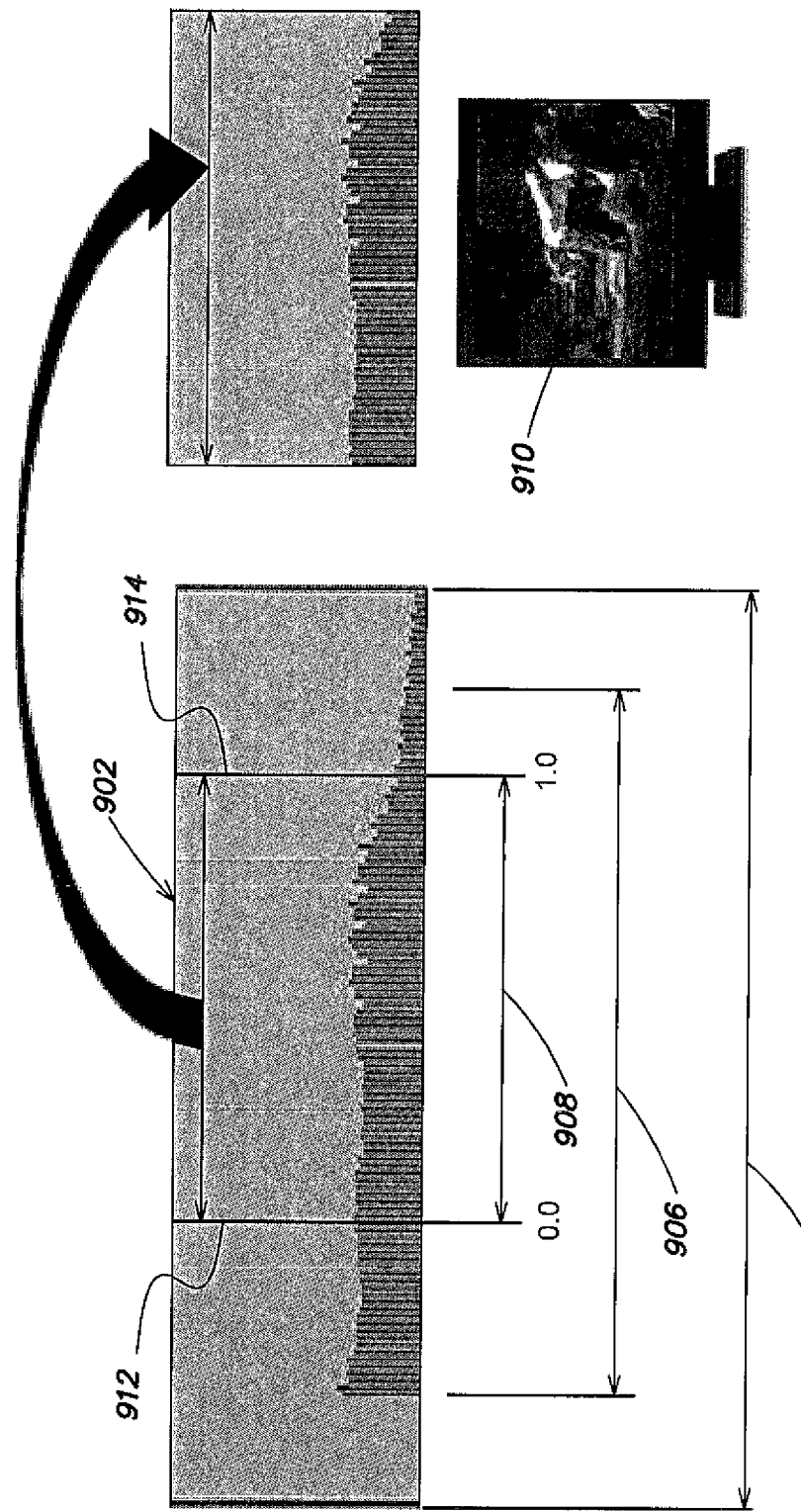
FIG. 9 illustrates dynamic range rendition parameters.

FIG. 9 illustrates the dynamic range parameters on histogram plot 902 of the pixel values of a given video frame. Essence range 904 spans the entire range that can be represented by the encoding scheme in which the frame is represented. Valid range 906 spans the extent to which the essence range is populated by pixel values of the frame, while legal range 908 indicates the range of pixel values that is to be mapped to the range spanning reference black and reference white points, i.e., 0 to 100% IRE range. The legal range may correspond to a broadcast safe range, i.e., a range that may be represented on a standard definition (SD) or high definition (HD) television monitor, as illustrated in FIG. 9 by the broadcast of legal range 908 to television monitor 910. When creating a color editorial rendition rule, the editor may specify the legal range to indicate which part of the source dynamic range is to be shown. For example, for a video composition, if the editor wishes to show subtle details in the shadows of a frame rather than in the more brightly lit areas, the editor would slide the legal range towards the lower end of the valid range. Additional legal ranges that correspond to high dynamic range monitors may be specified. Such monitors may be able to display imagery with a dynamic range up to 4,000% IRE or even 10,000% IRE. In order to specify what is to be mapped onto such displays, a correspondingly wider legal range is specified by the editor from within the valid range. The user interface of the media composition application enables the editor to specify the legal range, for example by sliding lines 912 and 914 denoting the lower and upper limits of the legal range respectively to the left or right on top of pixel value histogram plot 902. Standard dynamic ranges corresponding to display device standards may be selected and thus constrain the separation of lines 912 and 914 to correspond to such standards, for example 0-100% IRE (SD, HD) or 0-4,000% IRE (HDR).

A second set of rendition related color parameters defines the color gamut in a multi-dimensional space. As with the dynamic range, the essence range corresponds to the range of values that may be represented by the encoding used to represent the image data, but, in this case, it is in multi-dimensional color space, such as RGB or $YC_BC_R$. The valid range corresponds to the range of color space values for which media samples in the represented color image exist. Thus, the essence range may include values that were not sampled from the original scene. For example, if 16-bit encoding is used, then not all of the possible 16-bit code words were captured by the camera.

Figure 10:
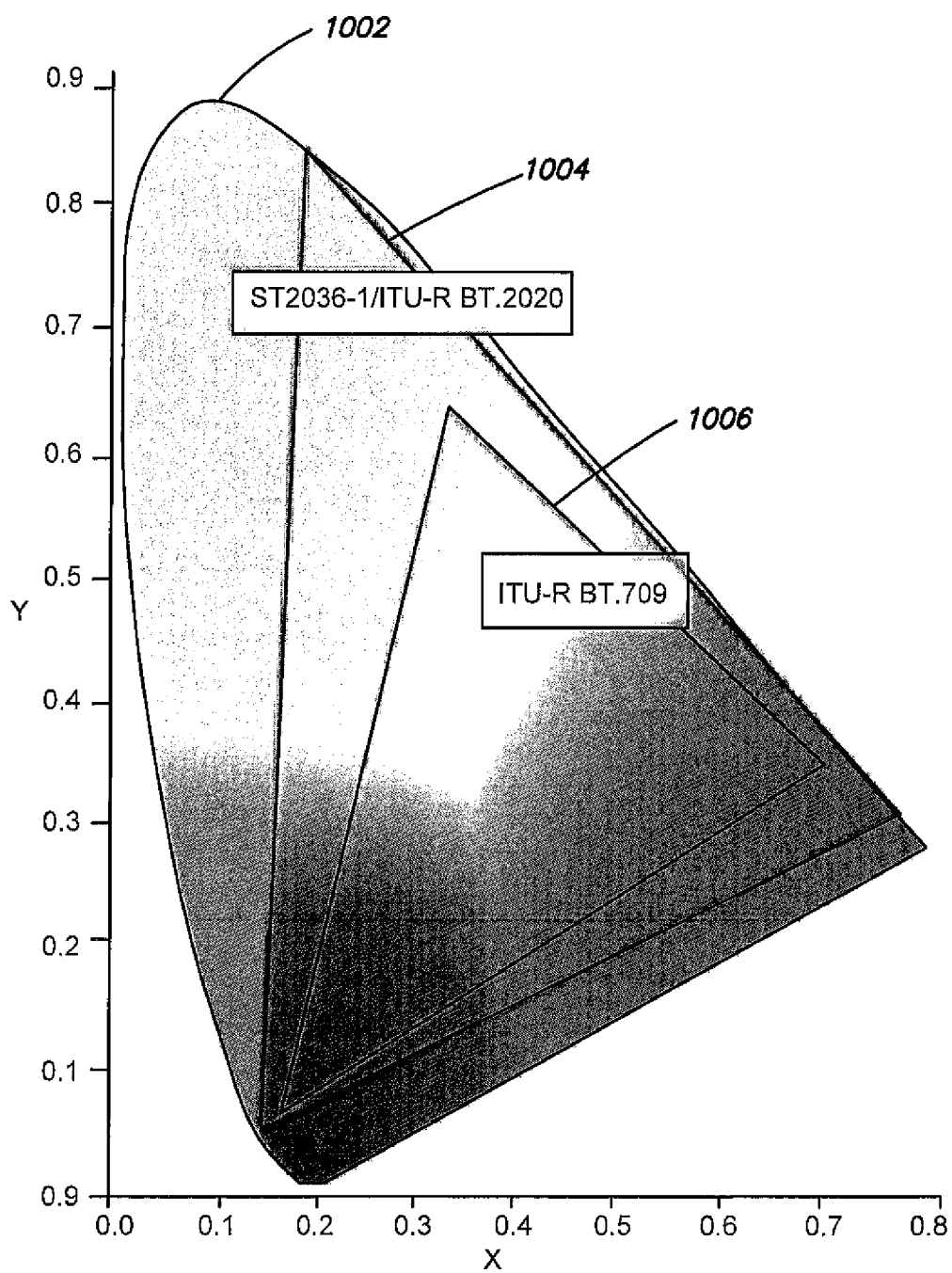
FIG. 10 is a CIE chromaticity diagram illustrating color space rendition parameters.

The legal range is an editorially determined range that is a subset of the valid range, and reflects the editor's choices as to which portion of color space is to be selected for representation in a rendition when it is not possible to display the full valid range. FIG. 10 is a Commission on Illumination (CIE) chromaticity diagram showing an example of color space parameter choices used by a color editorial rendition rule. The essence range is contained within outer envelope 1002 that spans all the color values representable by the image encoding scheme, which depends on the multidimensional bit depth of the pixel representation. Valid range 1004 is a subset of the essence range, and corresponds to International Telecommunications Union (ITU)-R BT 2020 gamut 1004, and the editor-specified legal range corresponds to ITU-709 gamut 1006. The user interface of the media composition application enables the editor to specify the legal color gamut range, for example by enabling the editor to select standard gamuts (such as ITU 709 (1006)) or to draw the envelope of the gamut on a two-dimensional color space plot such as a CIE chromaticity diagram as in FIG. 10, or on a perspective three-dimensional color space plot. In this manner, the editor is able to specify where the color resolution is to be concentrated on an output display that is not able to display the entire BT 2020 gamut faithfully.

In a manner analogous to that described above for spatial and temporal editorial rendition rules, color rendition rules and their parameters determine how an automated rendition engine generates a rendition in accordance with a rendition profile. For example, when the target color space legal range specified for the rendition occupies a smaller color space volume than that of the source media essence range, an editorial rendition rule determines whether the essence range volume is cropped to the legal range volume, or whether pixel values in the source media are scaled down to fit within the legal range volume. Conversely, when the target color space legal range occupies a larger volume than that of the source media essence range, the rendition rule specifies whether the essence range volume is scaled up and interpolated values are used to avoid aliasing artifacts, or whether the valid range is to be used.

In addition to specifying spatial, temporal, and color parameters, rendition profiles may also include auxiliary parameters that are required to specify a rendition fully. Auxiliary parameters include the codec to be used, a bandwidth for streaming distribution purposes, a file wrapper type, digital rights management information, and slate. For example, one rendition may be specified as 1080P in an MXF file wrapper with distribution rights for the US only. In general, such auxiliary rendition parameters, while required for a complete specification of a rendition to be generated, are not editorial in nature, and thus it is not necessary to provide an upstream editorial interface for tagging media with editorially-specified values for these parameters.

The distribution channels for consumption of the renditions discussed herein include, but are not limited to cinema theaters, over the air broadcast, cable, and satellite television and radio, over-the-top programming streamed to computers, tablets, and smartphones, and live streaming. Consumption environments include entertainment and educational settings, in public spaces or private institutional and corporate settings. These environments may be located in one or more geographical territories. Each channel, environment, and geography may engender specific requirements for media consumption, which are encapsulated in a correspondingly tailored rendition profile.

Referring back to FIG. 1, rendition engine 112 may comprise custom software and optionally hardware logic that is part of the media composition application 106. In other embodiments, the rendition engine includes a generic logical engine that inputs editorial rendition rules 110, and, in accordance with rendition profiles 114, executes the rules to generate renditions from source media assets 102 and effects (not shown in FIG. 1). In various embodiments, the rendition engine includes artificial intelligence techniques that involve learning from editorial rendition decisions of a cohort of editors for a range of compositional content, source media types, and rendition requirements. Deep learning methods may deploy multi-level neural networks to determine how to select rules and parameters, and how to select sources that optimize the rendered output with respect to available source media.

Figure 11:
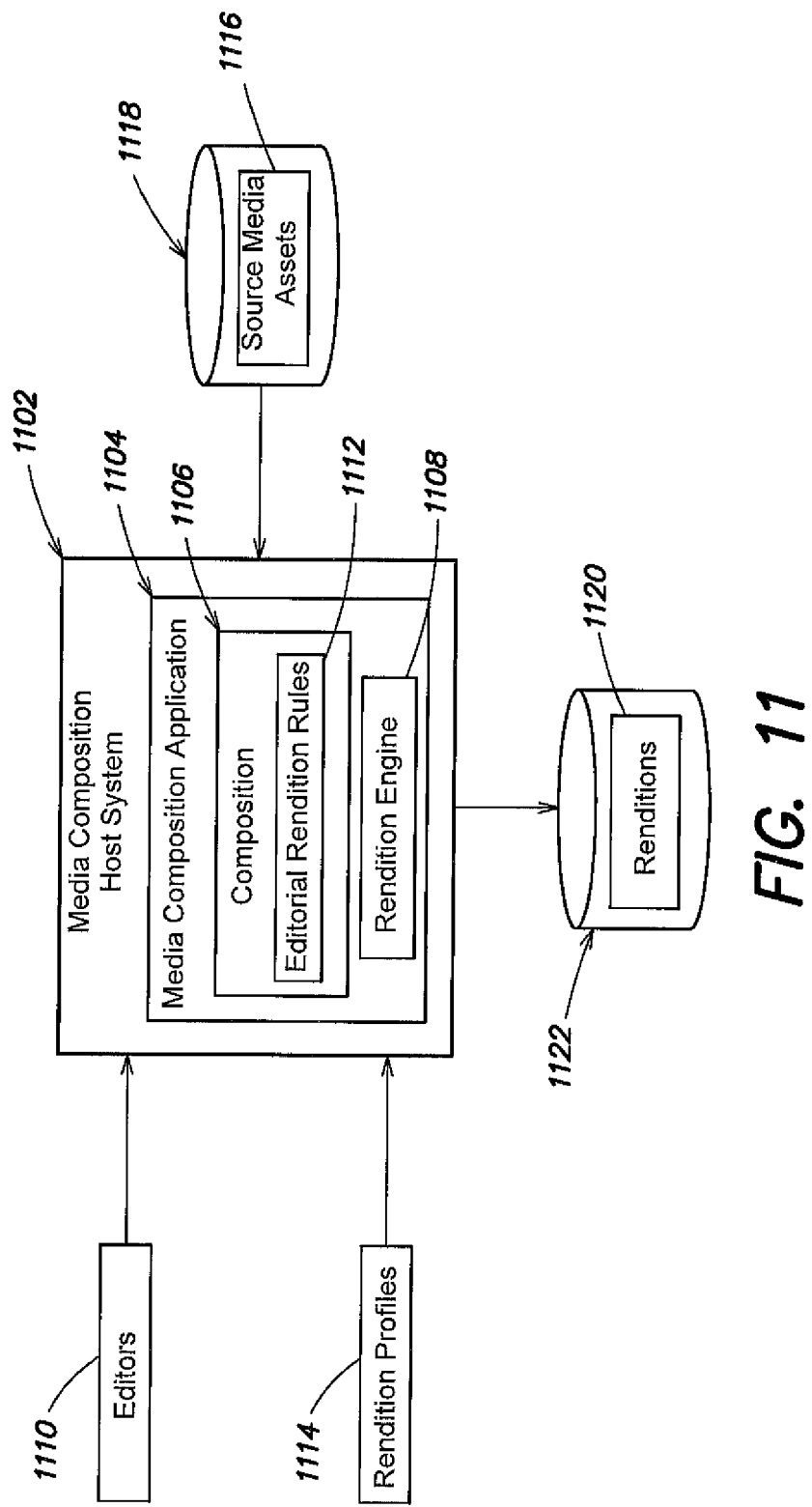
FIG. 11 is a high-level block diagram illustrating a system for automated media publishing.

FIG. 11 is a high-level block diagram illustrating a system for automated media publishing. Media composition host system 1102 hosts media composition application 1104, which includes composition 1106 and rendition engine 1108. One or more editors 1110 edit the composition, which includes specifying editorial rendition rules 1112 and tagging one or more compositional objects of composition 1106 with the rules. Rendition profiles 1114 are supplied to the media composition host system. When renditions specified by rendition profiles 1114 are to be generated, rendition engine 1108 accesses source media assets 1116 from storage 1118, and generates and outputs renditions 1120 to storage 1122. In the illustrated embodiment, rendition engine 1108 is implemented as part of media composition application, and has access to the media player software of the media composition application, which is able to read the composition in its original, unflattened form.

Figure 12:
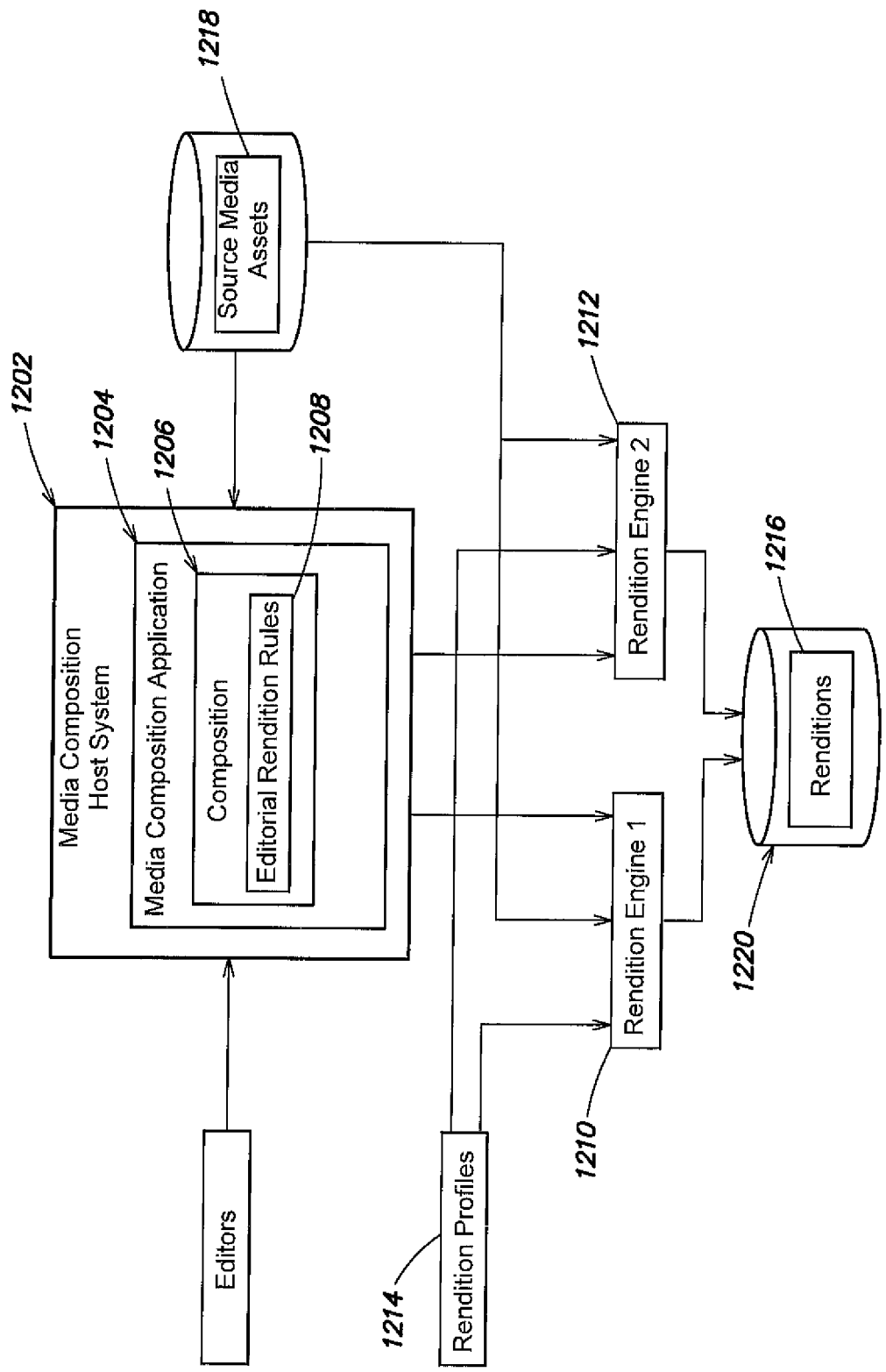
FIG. 12 is a high-level block diagram illustrating a system for automated media publishing with multiple rendition engines.

In other embodiments, illustrated in FIG. 12, the rendition engine is implemented on one or more platforms external to the media composition host system. In these embodiments, the rendition engine includes functionality similar to that of the media player software that is used by the media composition application so that it can read the rich composition in its original, unflattened form. Referring to FIG. 12, which shows the use of two rendition engines external to the media composition host system, media composition host system 1202 hosts media composition application 1204, which contains composition 1206 tagged with editorial rendition rules 1208. When renditions are to be generated, rendition engine 1 1210 and rendition engine 2 1212 receive rendition profiles 1214 and composition 1206, and generate renditions 1216 as specified by the rendition profiles and editorial rendition rules 1208, starting from source media assets 1218. The rendition engines output the renditions for storage on storage 1220. The external platforms on which the rendition engines are implemented may be in the same location as host 1202, connected, for example, over a local area network, or they may be hosted by one or more remote servers or by a private or public cloud.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network, or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of editing a media composition, the method comprising:
    enabling an editor using a media composition application running on a media composition host system to:
        edit a media composition, wherein the media composition includes a compositional object, and the compositional object references a source media asset;
        specify an editorial rendition rule for the compositional object, wherein the editorial rendition rule specifies how the compositional object is to be rendered for each value of a plurality of values of an essence encoding parameter; and
        associate the editorial rendition rule with the compositional object of the media composition; and
    when a rendition of a given media composition is to be generated, a rendition engine:
        receives the given media composition, wherein the given composition includes an editorial rendition rule associated with a compositional object;
        receives a rendition profile that specifies a given value of a media essence encoding parameter for the rendition of the given media composition;
        inputs a source media asset of the given composition; and
        generates from the source media asset of the given media composition the rendition of the compositional object of the given media composition in accordance with the editorial rendition rule of the given composition as it applies to the compositional object for the given value of the media essence encoding parameter.

2. The method of claim 1, wherein the media composition application includes the rendition engine.

3. The method of claim 1, wherein the rendition engine is hosted on a platform external to the media composition host.

4. The method of claim 1, wherein the rendition profile specifies a version of the given media composition that is to be used to generate the rendition of the given composition.

5. The method of claim 1, wherein the editorial rendition rule of the given composition is a spatial editorial rendition rule and the media essence encoding parameter specified by the rendition profile is a spatial rendition parameter.

6. The method of claim 5, wherein the spatial rendition parameter is a framing box that defines a portion of a video frame of the compositional object of the given media composition, and wherein the rendition engine prioritizes for inclusion within the rendition a first portion of the source media asset of the given composition that lies within the framing box.

7. The method of claim 6, wherein an aspect ratio of a target display for the rendition is larger than an aspect ratio of the framing box, and wherein the rendition engine further prioritizes for inclusion within the rendition a second portion of the source media asset of the given composition outside the framing box, wherein the second portion of the source media asset of the given media composition includes media essence data.

8. The method of claim 1, wherein the editorial rendition rule of the given composition is a temporal editorial rendition rule and the media essence encoding parameter specified by the rendition profile is a temporal rendition parameter.

9. The method of claim 8, wherein the temporal rendition parameter includes a temporal framing range that defines a temporal range within the source media asset of the given composition, and wherein the rendition engine prioritizes for inclusion within the rendition a temporal portion of the source media asset of the given media composition that lies within the temporal framing range.

10. The method of claim 1, wherein the editorial rendition rule of the given composition is a dynamic range editorial rendition rule and the media essence encoding parameter specified by the rendition profile is a dynamic range rendition parameter.

11. The method of claim 10, wherein the source media asset of the given composition is a video asset, and the dynamic range rendition parameter is a legal dynamic range that defines a range of pixel brightness values within the source media asset of the given composition, and wherein the rendition engine prioritizes for inclusion within the rendition pixels of the source media asset of the given composition having brightness values that lie within the legal range.

12. The method of claim 10, wherein the source media asset of the given composition is an audio asset, and the dynamic range rendition parameter is a legal dynamic range that defines a range of audio sample intensity values within the source media asset of the given composition, and wherein the rendition engine prioritizes for inclusion within the rendition audio samples of the source media asset of the given composition having intensity values that lie within the legal range.

13. The method of claim 1, wherein the editorial rendition rule of the given composition is a color editorial rendition rule and the media essence encoding parameter specified by the rendition profile is a color gamut rendition parameter.

14. The method of claim 13, wherein:
the source media asset of the given composition is one of a graphics asset and a video asset;
the color gamut rendition parameter includes a legal color range that defines a multi-dimensional region within a multi-dimensional color space; and
the rendition engine prioritizes for inclusion within the rendition pixels of the source media asset of the given composition having color values that lie within the legal color range.

15. The method of claim 1, wherein:
the editorial rendition rule of the given composition is a spatial editorial rendition rule for layout of title text on a frame of the rendition;
the media essence encoding parameter specified by the rendition profile is a spatial framing box;
the source media asset of the given composition is a text titling effect; and
the rendition engine renders text of the text titling effect within the framing box on the frame of the rendition.

16. The method of claim 1, wherein:
the editorial rendition rule of the given composition is a compositing editorial rendition rule;
the media essence encoding parameter specified by the rendition profile is a spatial framing box;
the source media asset of the given composition is a compositing effect; and
the rendition engine renders a frame of the rendition with a composited image within the framing box.

17. The method of claim 1, wherein the rendition profile and the editorial rendition rule of the given composition are received by the rendition engine in a standardized form, and the rendition engine comprises generic logic for executing rules.

18. The method of claim 1, wherein the rendition engine includes logic that is learned using deep learning methods from captured editorial rendition decisions of a cohort of editors working with a range of media content, source media types, and rendition requirements.

19. A computer program product comprising:
non-transitory computer-readable storage with computer program instructions stored thereon, wherein the computer program instructions, when processed by a computer, instruct the computer to perform a method of editing a media composition, the method comprising:
enabling an editor using a media composition application running on a media composition host system to:
edit a media composition, wherein the media composition includes a compositional object, and the compositional object references a source media asset;
specify an editorial rendition rule for the compositional object, wherein the editorial rendition rule specifies how the compositional object is to be rendered for each value of a plurality of values of an essence encoding parameter; and
associate the editorial rendition rule with the compositional object of the media composition; and
when a rendition of a given media composition is to be generated, a rendition engine:
receives the given media composition, wherein the given composition includes an editorial rendition rule associated with a compositional object;
receives a rendition profile that specifies a given value of a media essence encoding parameter for the rendition of the given media composition;
inputs a source media asset of the given composition; and
generates from the source media asset of the given media composition the rendition of the compositional object of the given media composition in accordance with the editorial rendition rule of the given composition as it applies to the compositional object for the given value of the media essence encoding parameter.

20. A media composition editing system comprising:
a memory for storing computer-readable instructions; and
a processor connected to the memory, wherein the processor, when executing the computer-readable instructions, causes the system to:
  enable an editor using a media composition application running on a media composition host system to:
    edit a media composition, wherein the media composition includes a compositional object, and the compositional object references a source media asset;
    specify an editorial rendition rule for the compositional object, wherein the editorial rendition rule specifies how the compositional object is to be rendered for each value of a plurality of values of an essence encoding parameter; and
    associate the editorial rendition rule with the compositional object of the media composition; and
  when a rendition of a given media composition is to be generated, a rendition engine:
    receives the given media composition, wherein the given composition includes an editorial rendition rule associated with a compositional object;
    receives a rendition profile that specifies a given value of a media essence encoding parameter for the rendition of the given media composition;
    inputs a source media asset of the given composition; and
    generates from the source media asset of the given media composition the rendition of the compositional object of the given media composition in accordance with the editorial rendition rule of the given composition as it applies to the compositional object for the given value of the media essence encoding parameter.

* * * * *